Sept. 7, 1965   J. E. GORGENS   3,204,464
SHOCK RESISTANT BOURDON TUBE
Filed Aug. 17, 1962

INVENTOR.
JOSEPH E. GORGENS
BY M. W. Goodwin
ATTORNEY

United States Patent Office 3,204,464
Patented Sept. 7, 1965

3,204,464
SHOCK RESISTANT BOURDON TUBE
Joseph E. Gorgens, Fairfield, Conn., assignor, by mesne assignments, to Dresser Industries, Inc., Dallas, Tex., a corporation of Delaware
Filed Aug. 17, 1962, Ser. No. 217,587
8 Claims. (Cl. 73—418)

This invention relates to Bourdon tube instruments, such as pressure gauges and the like, and more particularly to novel and improved means for preventing overstressing of a Bourdon tube during acceleration loading of the tube.

The use of Bourdon tubes in instruments such as pressure gauges, temperature gauges, etc. is, of course, well known. In such instruments, the Bourdon tube is usually filled with a liquid. The liquid pressure varies in response to a change in a condition being sensed; thus, causing the Bourdon tube to deform. The free end or tip of the Bourdon tube is usually connected by a suitable linkage to an output member which may be a pointer associated with a dial face. It is desirable that the tube be unrestrained over its deformable length so that the maximum movement of the tube tip may be obtained. Also, any restraint of the tube in the range of its normal travel may be reflected in inaccuracies of gauge indication. However, the lack of restraint on the tube permits the tube to be deflected by acceleration forces or loads externally applied to the instrument. Also, such forces acting on the movement and pointer of a Buordon tube gauge may result in additional forces on the Bourdon tube tending to cause it to deflect. This deflection of the Bourdon tube may become excessive and result in an over-stressing of the tube with an attendant set of the tube. This will, of course, cause, at the least, a shift in the zero position of a pointer driven by the tube.

Accordingly, it is the primary object of this invention to provide novel and improved means to restrain the tip of a Bourdon tube and prevent the tube from being deflected beyond the elastic limit of the tube material but which will not interfere with usual tube deformation.

It is a further object of this invention to provide such restraining means which will prevent excessive movement of a Bourdon tube tip in all planes in which the tip is free to move.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
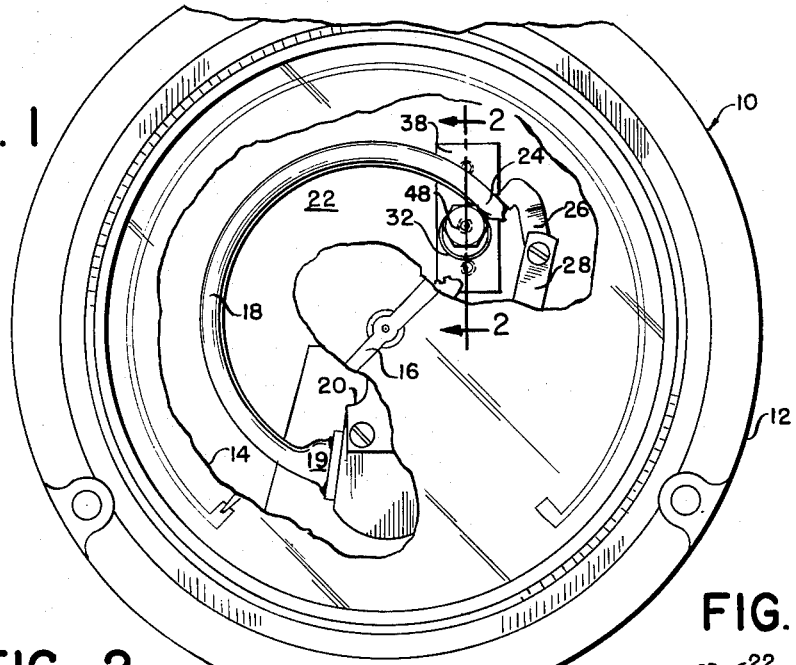
FIG. 1 is a fragmentary, front view of a Bourdon tube instrument embodying the present invention, with a part of the instrument being cut away to reveal the tip restraining means of this invention.

With reference to FIG. 1 of the drawing, there is shown an exemplary Bourdon tube instrument 10 of a type with which this invention is concerned. The instrument 10 comprises a casing 12 housing a dial 14 and a pointer 16. Also housed within the casing 12 is a Bourdon tube 18. One end 19 of the tube 18 is connected to a bracket or frame 20 which is mounted on the back wall 22 of the casing 12. The other end 24 of the Bourdon tube is rigidly connected to a tip bracket 26 which in turn is pivotally connected to one end of a link 28. The other end of the link 28 is connected to a suitable movement (not shown) for drivingly connecting the link 28 and pointer 16.

Figure 2:
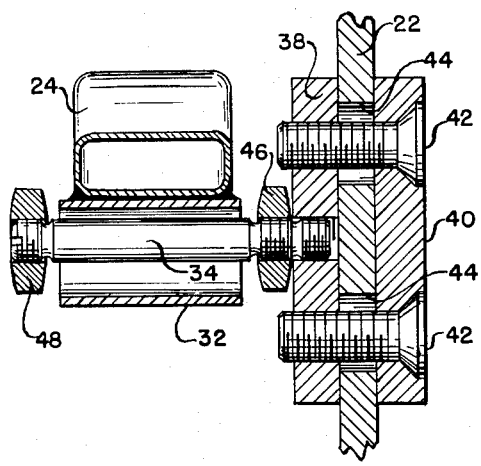
FIG. 2 is an enlarged, fragmentary, cross-sectional view substantially along the line 2—2 of FIG. 1.

In accordance with this invention, I provide novel means associated with the tube tip 24 to restrain the travel of the tip 24 while not interfering with normal tip movement. A preferred form of the invention is best shown in FIG. 2. Mounted rigidly on the tube 18 adjacent the tip 24 is a thin walled, cylindrical member or stop cylinder 32. Extending longitudinally within the tube 32 is a rigid cylindrical member or post 34. The post 34 has at one end a threaded portion threadably engaged in a mounting plate 38. The mounting plate 38 is clamped to the inside surface of the back wall 22 of the casing 12 by means of a clamping plate 40 disposed externally of the back wall 22 and a pair of clamping screws 42. The screws 42 are received in smooth walled apertures in the clamping plate and extend through a pair of substantially oversize apertures or clearance openings 44 in the back wall 22. The screws 42 are threadably engaged in threaded apertures in the mounting plate 38. By loosening the screws 42, the post 34 may be shifted radially relative to the stop 32 within the limits defined by the clearance around screws 42 provided by the apertures 44. The screws 42 may then be tightened to clamp the mounting plate 38 securely to the back wall 22 and fix the post 34 in the desired position radially relative to the stop 34. Also, in accordance with my invention, and for a purpose to be described, a nut 46 is mounted on the threaded portion of the post 34 next adjacent the mounting plate, and a second nut 48 is mounted on a threaded portion on the other free end of the post.

As can be seen from FIGS. 1 and 2, the diameter of the post 34 is much less than the inner diameter of the tube 32. By a proper selection of the post diameter and inner diameter of the tube 32, the stop 34 will not in any way interfere with normal movement of the Bourdon tube tip 24, while it will prevent excessive overtravel of the tip 24 in any direction within the general plane of the Bourdon tube. In accordance with the object of providing means to prevent excessive movement of the tube tip 24 in all planes in which the tip is free to move, it will be observed from a consideration of FIG. 2 that the tube 32 is of such a length, as is the post 24, that the tube 32 provides surface contact with the post 34 at points spaced sufficient distances along the post that torsional or angular movement of the tube tip is limited in planes extending at right angles to the general plane of the Bourdon tube. It will be seen that the stop tube 32 is the only element of my invention which is mounted on the Bourdon tube. Inasmuch as this element may be fabricated from very thin material, on the order of .010″ to .030″ thick, the stop 32 will not add any appreciable weight to the tip 24. Thus, the stop 32 will not cause any serious increase in tip motion during shock loading of the Bourdon tube.

The nuts or adjustable abutments 46 and 48 are of an outer diameter sufficient that they are engageable by the ends of the stop tube 32 in response to axial movement of the stop tube. The nuts 46 and 48 are adjusted longitudinally of the post 34 to assure that they will prevent movement of the Bourdon tip 24 in a direction at right angles to the general plane of the tube which is sufficient to cause overstressing and a set, in the tube material. Thus, it will be seen that I have provided a novel and improved means for preventing overstressing of a Bourdon tube during shock loading of the instrument without in any way interfering with normal operation of the instrument and without adversely affecting the accuracy of the instrument.

Figure 3:
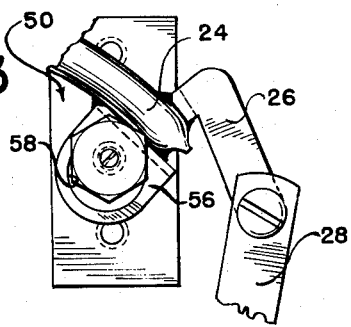
FIG. 3 is a plan view of an alternative embodiment of the invention.
Figure 4:
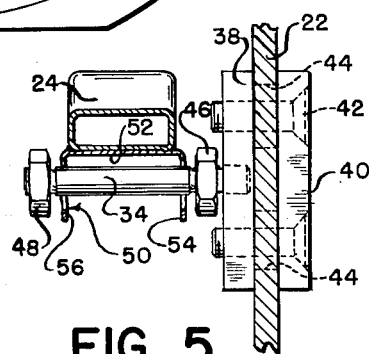
FIG. 4 is a cross-sectional view of the embodiment of FIG. 3.

An alternative embodiment of the invention is shown in FIGS. 3 and 4. In this embodiment, all of the elements of the invention of FIGS. 1 and 2 are included in the embodiment of FIGS. 3 and 4 with the exception of the elongate tube 32. In place of an elongated tube, I utilize as a tip stop a member, generally indicated at 50. The member 50 is generally U-shaped, comprising a base 52 and a pair of upstanding legs 54, 56. The tip stop 50 may be fabricated from sheet metal, or other suitable light material. The legs 54, 56 have aligned apertures 58 within which the post 34 is received in radially spaced relation. The purpose and operation of the tip stop 50 is identical with that of the tip stop 32 previously described but has the added advantage of lighter weight.

Figure 5:
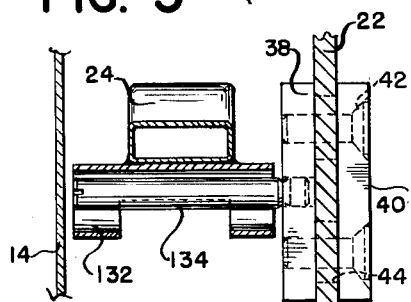
FIG. 5 is a fragmentary, cross-sectional view of a Bourdon tube instrument incorporating another embodiment of this invention.

In the embodiment of FIG. 5, the tip stop 132 is generally the same as the tip stop 32 previously described except that a portion of the tube is cut away intermediate the ends of the tube in order to obtain less weight at the tip of the Bourdon tube. Also in the embodiment of FIG. 5, the post 134 is mounted on the back wall 22 of the casing in the same manner as the post 34. However, the post 134 does not have any threaded portions mounting adjustable abutment members. Rather, in order to limit movements of the Bourdon tube tip out of the general plane of the Bourdon tube, the stop member 132 extends in opposite directions beyond the Bourdon tube at right angles to said general plane to bring the ends of the stop member into relatively closely spaced relation to the dial 14 and post mounting plate 38, both of which are fixed relative to the casing. Inasmuch as the ends of the stop member are normally spaced from the dial and mounting plate, these fixed members will not interfere with normal movement of the tube 18. However, the ends of the stop member are sufficiently close to these fixed members that engagement therebetween will prevent overtravel of the Bourdon tube in directions at right angles to the general plane of the Bourdon tube.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a Bourdon tube instrument, means for preventing overstressing of the Bourdon tube tip during shock loading of the instrument, comprising a pair of relatively movable members, one member being mounted on the Bourdon tube, the other member being fixed, said members being normally spaced apart but being engageable to limit movement of the Bourdon tube tip in all directions within the general plane of the Bourdon tube, and stop means normally spaced from and engageable with said one of said members in response to movement of the Bourdon tube tip a predetermined distance in either of both directions extending at right angles to the general plane of the Bourdon tube.

2. In a Bourdon tube instrument, means for preventing overstressing of the Bourdon tube tip during shock loading of the instrument, comprising a pair of relatively movable members, one member being mounted on the Bourdon tube, the other member being fixed, said members being normally spaced apart and being constructed and arranged to be engageable to limit movement of the Bourdon tube tip in all directions within the general plane of the Bourdon tube and in an angular direction within planes extending at right angles to said general plane; and abutment means normally spaced from but engageable with said one member to limit movement of the Bourdon tube tip in opposite directions extending at right angles to the general plane of the Bourdon tube.

3. In a Bourdon tube instrument, means for preventing overstressing of the Bourdon tube during shock loading of the instrument, comprising a stop member and a rigid member, one of said stop and rigid members being mounted on the tip of the Bourdon tube for movement therewith and the other said members being fixed, said stop member providing a surface surrounding said rigid member and normally spaced therefrom so as not to interfere with normal operation of the Bourdon tube but being engageable therewith to limit movement of the tip of the tube in all directions within the general plane of the tube, and means for limiting movement of the tip of the tube at right angles to the general plane of the tube including a pair of members adjustably mounted on said rigid member for movement longitudinally thereof and toward and away from the end of said stop member, whereby the permitted movement of the Bourdon tube tip at right angles to said general plane may be selectively adjusted.

4. In a Bourdon tube instrument, means for preventing overstressing of the Bourdon tube during shock loading of the instrument, comprising a pair of relatively movable members one of which is mounted for movement with the Bourdon tube tip and the other of which is fixed, one member having surface means surrounding said other member and extending in a direction at right angles to the general plane of the Bourdon tube, said surface means being normally spaced from said other member so as not to interfere with normal operation of the Bourdon tube while at the same time limiting movement of the tip of the Bourdon tube in all directions within said general plane, said surface means and other member extending sufficiently in a direction at right angles to said general plane and being engageable at points spaced a sufficient distance along said direction extending at right angles to said general plane that angular movement of the tube tip is limited in planes at right angles to said general plane, and abutment means in fixed relation to one of said members and engageable with the other of said members to limit movement of the Bourdon tube in opposite directions at right angles to said general plane.

5. In a Bourdon tube instrument having a casing housing a Bourdon tube fixed at one end relative to the casing, the other end of said tube being movable; means for limiting movement of said other end of the Bourdon tube in all planes of movement thereof to prevent overstressing of the Bourdon tube during shock loading of the instrument, comprising a stop member mounted for movement with said other end of the Bourdon tube and extending at right angles to the general plane of the Bourdon tube, a rigid member surrounded by and extending longitudinally of and within said stop member and being fixed relative to said casing, said rigid member being of substantially lesser diameter than said stop member, said stop member providing generally circular surfaces spaced apart longitudinally of said rigid member a distance sufficient to limit torsional movement of said other end of the Bourdon tube in response to engagement of said surfaces and said rigid member, said stop member and rigid member further being engageable to limit movement of said other end of the Bourdon tube in all directions within said general plane, and means on one of said stop and rigid member and engageable with means on the other of said stop and rigid member to limit movement of the other end of the Bourdon tube in opposite directions at right angles to said general plane.

6. In a Bourdon tube instrument as described in claim 5, said stop member being a generally U-shaped member having a base and a pair of upstanding legs, the base being mounted for movement with said other end of the Bourdon tube with said legs extending parallel to the general plane of the Bourdon tube, said legs having aligned openings through which said rigid member extends in radially spaced relation with said openings defining surfaces spaced longitudinally of said rigid member.

7. In a Bourdon tube instrument as described in claim 6, said rigid member being rigidly mounted on a mounting plate engaged with the inner surface of a wall of said casing, a clamping plate engaged with the outer surface of said wall, and clamping screws engaging said mounting plate and clamping plate to clamp the mounting plate to the wall, each of said screws extending through an aperture in said wall which has a diameter sufficiently in excess of the diameter of the screw to permit adjustment of said rigid member radially relative to said stop member.

8. In a Bourdon tube instrument as described in claim 5, said rigid member having threaded portions extending beyond said stop member in opposite directions at right angles to the general plane of the Bourdon tube, and a pair of abutment members respectively threadably engaged on said threaded portions, said abutment members being normally spaced from said stop member but being engageable therewith to limit movement of the Bourdon tube tip in directions at right angles to the general plane of the Bourdon tube.

References Cited by the Examiner

UNITED STATES PATENTS

| 1,485,412 | 3/24 | Heise | 73—411 |
| 2,874,573 | 2/59 | Green et al. | 73—414 |
| 3,123,791 | 3/64 | Roche et al. | 73—411 X |

FOREIGN PATENTS 578,677  7/46  Great Britain.

RICHARD C. QUEISSER, *Primary Examiner.*

ROBERT L. EVANS, *Examiner.*